(12) United States Patent
Nomura et al.

(10) Patent No.: US 10,887,331 B2
(45) Date of Patent: Jan. 5, 2021

(54) INFORMATION PROCESSING APPARATUS AND INFLUENCE-PROCESS EXTRACTION METHOD

(71) Applicant: NEC Corporation, Tokyo (JP)

(72) Inventors: Takashi Nomura, Tokyo (JP); Koji Kida, Tokyo (JP); Junpei Kamimura, Tokyo (JP); Yoshiaki Sakae, Tokyo (JP); Etsuko Katsuda, Tokyo (JP); Kazuhiko Isoyama, Tokyo (JP); Kentaro Yamasaki, Tokyo (JP); Yuji Kobayashi, Tokyo (JP)

(73) Assignee: NEC Coporation, Tokyo (JP)

( * ) Notice: Subject to any disclaimer, the term of this patent is extended or adjusted under 35 U.S.C. 154(b) by 215 days.

(21) Appl. No.: 15/126,920

(22) PCT Filed: Jun. 17, 2014

(86) PCT No.: PCT/JP2014/003227
§ 371 (c)(1),
(2) Date: Sep. 16, 2016

(87) PCT Pub. No.: WO2015/140843
PCT Pub. Date: Sep. 24, 2015

(65) Prior Publication Data
US 2017/0093900 A1 Mar. 30, 2017

(30) Foreign Application Priority Data
Mar. 20, 2014 (JP) .................................. 2014-058558

(51) Int. Cl.
*H04L 29/06* (2006.01)
*G06F 11/34* (2006.01)
*H04L 12/24* (2006.01)

(52) U.S. Cl.
CPC ...... *H04L 63/1425* (2013.01); *G06F 11/3447* (2013.01); *G06F 11/3476* (2013.01);
(Continued)

(58) Field of Classification Search
None
See application file for complete search history.

(56) References Cited

U.S. PATENT DOCUMENTS

2002/0061001 A1 * 5/2002 Garcia-Luna-Aceves .................. H04W 40/30 370/338
2005/0231368 A1 * 10/2005 Sasaki .................... G06Q 10/00 340/572.1

(Continued)

FOREIGN PATENT DOCUMENTS

| EP | 2613480 A1 | 7/2013 |
|---|---|---|
| JP | H06-175884 A | 6/1994 |

(Continued)

OTHER PUBLICATIONS

International Search Report corresponding to PCT/JP2014/003227, dated Nov. 18, 2014 (5 pages).

(Continued)

*Primary Examiner* — William J. Goodchild
(74) *Attorney, Agent, or Firm* — Wilmer Cutler Pickering Hale and Dorr LLP

(57) ABSTRACT

An information processing apparatus includes: a reach-extent extraction unit configured to extract, with use of a relationship graph representing relationships between a plurality of elements included in a system and location information that indicates, on the relationship graph, a plurality of locations in the system where anomalies have been detected, paths in the relationship graph as being reach extents, the path including a set of the elements that are directly or indirectly related to each of the plurality of (Continued)

locations as a source; and a shared-extent extraction unit configured to extract an influence process of an anomaly by extracting an extent that is shared in at least a prescribed number of paths among paths in the relationship graph that have been extracted as the reach extents.

18 Claims, 10 Drawing Sheets

(52) U.S. Cl.
CPC ...... *H04L 41/0631* (2013.01); *H04L 41/0677* (2013.01); *H04L 63/1416* (2013.01); *G06F 2201/875* (2013.01); *H04L 41/12* (2013.01)

(56) References Cited

U.S. PATENT DOCUMENTS

| | | | | |
|---|---|---|---|---|
| 2006/0256767 | A1* | 11/2006 | Suzuki | H04L 45/00 370/351 |
| 2007/0283042 | A1* | 12/2007 | West | H04L 65/80 709/238 |
| 2011/0087924 | A1* | 4/2011 | Kandula | G06F 11/0709 714/26 |
| 2011/0131252 | A1 | 6/2011 | Son et al. | |
| 2012/0215912 | A1 | 8/2012 | Houlihan et al. | |
| 2013/0097463 | A1* | 4/2013 | Marvasti | H04L 41/069 714/47.1 |
| 2013/0103739 | A1* | 4/2013 | Salgueiro | H04L 41/12 709/203 |
| 2013/0297972 | A1 | 11/2013 | Yokote et al. | |

FOREIGN PATENT DOCUMENTS

| | | |
|---|---|---|
| JP | H11-259331 A | 9/1999 |
| JP | 2010-152773 A | 7/2010 |
| JP | 2011-113122 | 6/2011 |
| JP | 2011-113571 A | 6/2011 |
| WO | WO-2012/073686 A1 | 6/2012 |

OTHER PUBLICATIONS

Extended European Search Report issued by the European Patent Office for European Application No. 14886257.6 dated Oct. 24, 2017 (10 pages).

Communication Pursuant to Article 94(3) EPC issued in European Patent Application No. 14886257.6, dated Feb. 24, 2020, 5 pages.

* cited by examiner

| VERTEX IDENTIFIER | EDGE |
|---|---|
| E1 | E2;L0, E3;L1;L1 |
| E2 | E1;L0, E3;L2 |
| E3 | E1;L1;L1, E2;L2 |
| E4 | |

INFORMATION PROCESSING APPARATUS AND INFLUENCE-PROCESS EXTRACTION METHOD

CROSS-REFERENCE TO RELATED APPLICATIONS

This application is a national stage application of International Application No. PCT/JP2014/003227 entitled "INFORMATION PROCESSING DEVICE, INFLUENCE-PROCESS EXTRACTION METHOD, AND RECORDING MEDIUM" filed on Jun. 17, 2014, which claims the benefit of the priority of Japanese Patent Application No. 2014-058558, filed on Mar. 20, 2014, the disclosures of each of which are hereby incorporated by reference in their entirety.

TECHNICAL FIELD

The present invention relates to an information processing apparatus, an influence-process extraction method, and a recording medium.

BACKGROUND ART

In a large-scale network system, when an anomaly is detected at a certain point, it is difficult to locate a point of cause of the anomaly and an extent of influence by the anomaly.

Accordingly, when the anomaly is detected, it has been required to perform analysis on a log of a host and the like included in the network system by a person in order to locate the point of cause and the extent of influence. Accordingly, there has been a problem in that locating the point of cause and the extent of influence takes a large amount of man-hour. There has also been a problem in that locating the point of cause and the extent of influence is dependent on the ability of an operator performing the analysis.

PTL 1 describes an attack determination apparatus that uses a plurality of kinds of evaluation parameters to estimate an attack source of an attack on a network to be monitored and an attack path thereof based on a log generated by equipment in the network to be monitored.

PTL 2 describes a method for detecting a fault position by using a dependency graph formally expressing the dependence in services latent on a network. The method is a method whereby the dependence in a dependency graph is traced so that a fault position is detected by extracting/limiting a set of services on network equipment causing a fault or to be affected by a fault.

CITATION LIST

Patent Literature

PTL 1: Japanese Unexamined Patent Application Publication No. 2010-152773
PTL 2: Japanese Unexamined Patent Application Publication No. Hei 11-259331

SUMMARY OF INVENTION

Technical Problem

However, the above-described techniques assume the case in which an anomaly is detected (a fault is found) at one point, but do not disclose the case in which anomalies are found at a plurality of points. Therefore, when anomalies are found at a plurality of points, anomaly influence processes may not be detected.

The present invention has been made in light of the above-described problems, and an object of the present invention is to provide an information processing apparatus that more appropriately extracts anomaly influence processes even if anomalies are found at a plurality of points.

Solution to Problem

An information processing apparatus according to one exemplary aspect of the present invention includes: reach-extent extraction means for extracting, with use of a relationship graph representing relationships between a plurality of elements included in a system and location information that indicates, on the relationship graph, a plurality of locations in the system where anomalies have been detected, paths in the relationship graph as being reach extents, the path including a set of the elements that are directly or indirectly related to each of the plurality of locations as a source; and shared-extent extraction means for extracting an influence process of an anomaly by extracting an extent that is shared in at least a prescribed number of paths among paths in the relationship graph that have been extracted as the reach extents.

An information processing apparatus according to one exemplary aspect of the present invention includes: acquisition means for acquiring a relationship graph representing relationships between a plurality of elements included in a system and location information that indicates, on the relationship graph, locations in the system where anomalies have been detected; and reach-extent extraction means for extracting, with use of the relationship graph and the location information acquired by the acquisition means, as an influence process of an anomaly, a path in the relationship graph including a set of the elements that are directly or indirectly related to each of the locations as a source.

An influence-process extraction method for an information processing apparatus method according to one exemplary aspect of the present invention, includes: extracting, with use of a relationship graph representing relationships between a plurality of elements included in a system and location information that indicates, on the relationship graph, a plurality of locations in the system where anomalies have been detected, paths in the relationship graph as being reach extents, the path including a set of the elements that are directly or indirectly related to each of the plurality of locations as a source; and extracting an influence process of an anomaly by extracting an extent that is shared in at least a prescribed number of paths among paths in the relationship graph that have been extracted as the reach extents.

An influence-process extraction method for an information processing apparatus according to one exemplary aspect of the present invention, includes: acquiring a relationship graph representing relationships between a plurality of elements included in a system and location information that indicates, on the relationship graph, locations in the system where anomalies have been detected; and extracting, with use of the acquired relationship graph and the location information, a path in the relationship graph as being an influence process of an anomaly, the path including a set of the elements that are directly or indirectly related to each of the locations as a source.

A computer program to be installed in a computer to achieve the information processing apparatus or the influence-process extraction method, and a computer-readable storage medium that stores the computer program are also included in the scope of the present invention.

Advantageous Effects of Invention

The present invention enables to more appropriately extract anomaly influence processes even if anomalies are found at a plurality of points.

DESCRIPTION OF EMBODIMENTS

First Exemplary Embodiment

Figure 1:
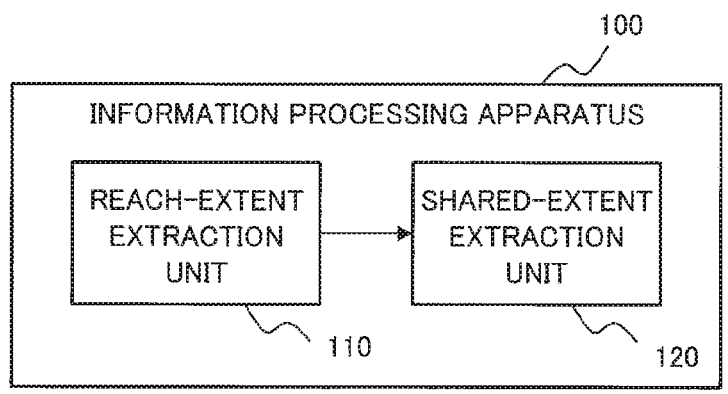
FIG. 1 is a functional block diagram illustrating an example functional configuration of an information processing apparatus according to a first exemplary embodiment of the present invention.

A first exemplary embodiment of the present invention is described in detail with reference to the drawings. FIG. 1 is a diagram illustrating an example configuration of an information processing apparatus 100 according to the first exemplary embodiment of the present invention. As illustrated in FIG. 1, the information processing apparatus 100 includes a reach-extent extraction unit 110 and a shared-extent extraction unit 120.

Figure 2:
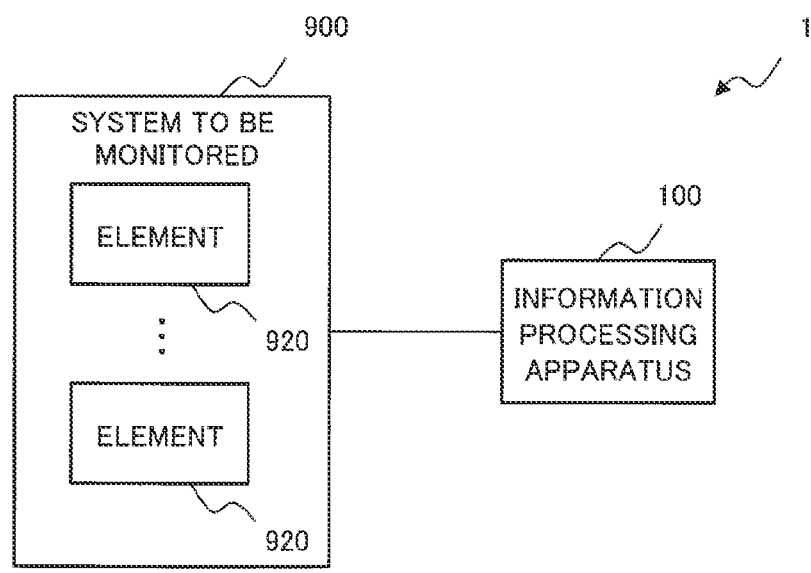
FIG. 2 is a block diagram illustrating an example configuration of an information processing system according to the first exemplary embodiment of the present invention.

With reference to FIG. 2, an information processing system 1 that includes the information processing apparatus 100 is described. FIG. 2 is a diagram illustrating an example configuration of the information processing system 1 according to the present exemplary embodiment. As illustrated in FIG. 2, the information processing system 1 includes the information processing apparatus 100 and a system to be monitored (simply referred to as a "system") 900. The information processing apparatus 100 and the system to be monitored 900 are connected via a not-shown network. Regardless of the example in FIG. 2, a plurality of system to be monitored 900 may be connected to the information processing apparatus 100.

The system to be monitored 900 includes a plurality of elements 920. Each one of the elements 920 is related in some way to another one of the elements 920.

For example, the system to be monitored 900 is an information processing system that includes a plurality of hosts (not shown) connected via a network and processes (not shown) operating on the hosts.

The system to be monitored 900 may be a social network.

The system to be monitored 900 may also be a set of data items (elements 920) that have some structure. The set of data items that have some structure is, for example, a set of files that are related in a hyperlinking and hyperlinked manner.

Regardless of the examples mentioned above, the system to be monitored 900 may be any system.

Next, each unit of the information processing apparatus 100 is described.

(Reach-Extent Extraction Unit 110)

The reach-extent extraction unit 110 receives, from a not-shown external apparatus, a relationship graph representing relationships between a plurality of nodes (also referred to as elements) included in the system to be monitored 900 and information (location information) indicating a plurality of locations on the relationship graph. The location information is information indicating locations in the system to be monitored 900 where anomalies have been detected. The reach-extent extraction unit 110 may be configured to acquire the relationship graph and the location information from another not-shown means within the information processing apparatus 100. A method for acquiring the relationship graph and the location information is not limited to particular methods.

Figures 3, 4:
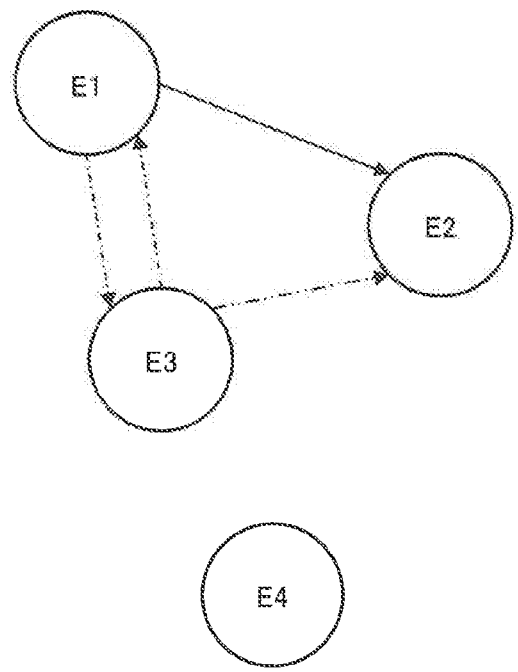
FIG. 3 is a diagram illustrating an example relationship graph used in the information processing apparatus according to the first exemplary embodiment of the present invention.
FIG. 4 is a conceptual diagram illustrating relationships between elements represented by a relationship graph used in the information processing apparatus according to the first exemplary embodiment of the present invention.

A relationship graph is described with reference to FIG. 3 and FIG. 4. FIG. 3 is a diagram illustrating an example relationship graph representing relationships between a plurality of elements included in the system to be monitored 900.

The relationship graph is a graph in which each of the elements 920 serves as a vertex (also referred to as an element or a node) and a relationship between one and another of the elements 920 serves as an edge (also referred to as a link or a branch). The relationship graph represents relationships between the elements 920 of the system to be monitored 900. The relationship herein refers to, for example, a data transfer relationship indicating that "data has been transferred between elements in a certain period" or a data transfer relationship indicating that "data is in a transferable state between elements in a certain moment (or period)". As illustrated in FIG. 3, the relationship graph is consisting of records including vertex identifiers and edges. The vertex identifier is an identifier of the element 920 being a vertex. The edge is information indicating a relationship between one of the vertices (elements 920) identified by each of the vertex identifiers and another of the vertices (elements 920).

For example, vertex identifier "E1" identifies the element 920 having identifier "E1". Then, edge "E2;L0, E3;L1;L1", which associates with vertex identifier "E1", indicates as follows: Firstly, element 920 "E1" has an edge representing a relationship with element 920 "E2", and an attribute of the edge is L0; Secondly, element 920 "E1" has two edges representing relationships with element 920 "E3", and attributes of the edges are both "L1".

For example, a blank of an edge in the record of vertex identifier "E4" indicates that element 920 "E4" has no edges (no relationships) with respect to any other elements 920.

An edge indicates that, for example, preparation for executing communication between the elements 920 that share the edge is in a completed state. An attribute of an edge indicates, for example, a protocol type of communication executed in the edge. The edges or the types of edges are not limited to the above-mentioned examples, but may be arbitrarily defined to indicate relationships between the elements 920. The relationship graph may be a relationship graph in any form regardless of the above-mentioned examples.

FIG. 4 is a conceptual diagram illustrating relationships between the elements 920 represented by a relationship graph. In FIG. 4, vertices are indicated by circles and vertex identifiers are indicated within the circles. Edges are indicated by line segments linking the circles. For example, a line segment indicated by a solid line indicates an edge of type "L0". A line segment indicated by an alternate long and short dashed line indicates an edge of type "L1". A line segment indicated by an alternate long and double-short dashed line indicates an edge of type "L2". Arrows indicate directions from relationship-generating sides to outsides.

The relationship graph may be indicated in any form regardless of the above-mentioned examples. For example, the relationship graph may take a data structure such as an adjacency list or an adjacency matrix.

Next, location information that is acquired by the reach-extent extraction unit 110 is described. The reach-extent extraction unit 110 acquires, as location information, information indicating an element and/or information indicating an edge. The information indicating an element refers to, for example, a vertex identifier. The information indicating an edge refers to, for example, information represented by vertex identifiers connected at opposite ends of an edge. The location information is not limited to these examples, but may be any information indicating locations on a relationship graph.

In the present exemplary embodiment, the locations in the system to be monitored 900 where anomalies have been detected refer to, for example, locations in the system to be monitored 900 where infections with malware or the like have been detected, but the present invention is not limited to this example.

Returning to FIG. 1, the reach-extent extraction unit 110 is described. The reach-extent extraction unit 110 extracts a path in the relationship graph including a set of the elements that are directly or indirectly related to each of the locations as a source indicated on the relationship graph by the location information. The reach-extent extraction unit 110 scans and extracts, for example, by backtracing, the path in the relationship graph reached from each of the sources (an extent directly or indirectly related to each of the sources). The backtracing herein refers to, when the relationship graph is a directed graph, tracing directed edges in a backward direction. In the present exemplary embodiment, backtracing is also referred to as backward search.

The method for extracting paths is not limited to the above-mentioned example, but may be, for example, Dijkstra's algorithm. The reach-extent extraction unit 110 then supplies the shared-extent extraction unit 120 with the paths (reach extents) in the relationship graph extracted for each of the locations on the relationship graph where the anomalies have been detected.

(Shared-Extent Extraction Unit 120)

The shared-extent extraction unit 120 receives, from the reach-extent extraction unit 110, the paths in the relationship graph extracted for each of the locations on the relationship graph where anomalies have been detected. The shared-extent extraction unit 120 then extracts an extent that is shared in at least a prescribed number of paths among the plurality of paths in the relationship graph that have been extracted. The shared extent to be extracted may be an element, an edge, or a set of elements or edges. The shared-extent extraction unit 120 then extracts an influence process of an anomaly from the shared extent extracted. The at least prescribed number of the paths may be all the paths or at least a predetermined number or proportion of the paths.

Figure 5:
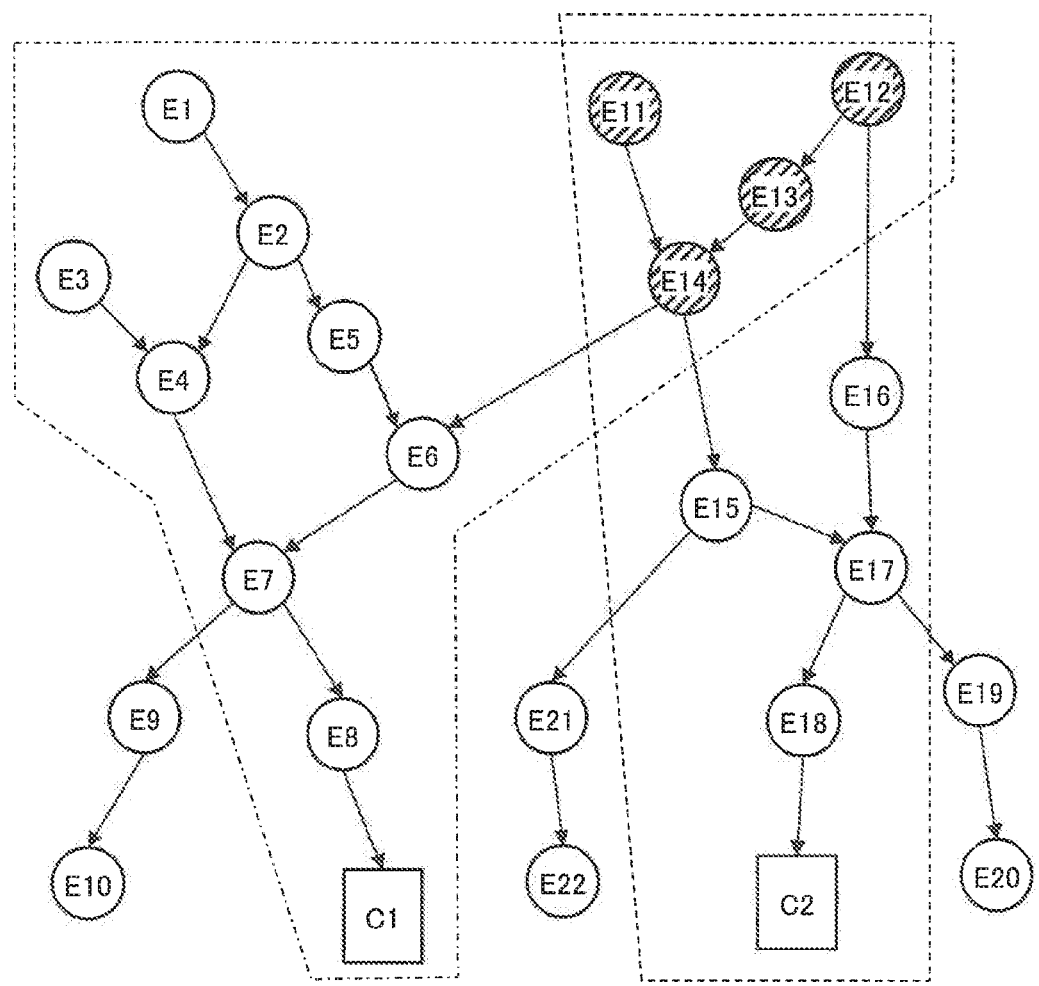
FIG. 5 is a diagram illustration the operation of the information processing apparatus according to the first exemplary embodiment of the present invention.

With reference to FIG. 5, the operation of the information processing apparatus 100 is more specifically described. FIG. 5 is a diagram illustration the operation of the information processing apparatus 100. The diagram in FIG. 5 illustrates an example relationship graph. The relationship graph illustrated in FIG. 5 is constituted of elements indicated by vertex identifiers E1 to E22, C1, and C2, and directed line segments (edges) linking the elements. For the purpose of illustration, the elements indicated by vertex identifiers E1 to E22 are indicated by circles, and the elements indicated by vertex identifiers C1 and C2 are indicated by squares.

When information (location information) indicating locations on the relationship graph where anomalies have been detected is C1 and C2, the reach-extent extraction unit 110 extracts a path in the relationship graph reached from C1, C1 being as a source. The reach-extent extraction unit 110 then extracts an extent (paths) enclosed by an alternate long and short dashed line in FIG. 5 as being a reach extent reached from C1.

The reach-extent extraction unit 110 extracts a path (reach extent) in the relationship graph reached from C2, C2 being as a source. The reach-extent extraction unit 110 then extracts an extent enclosed by a dashed line in FIG. 5 as being a reach extent from C2.

The reach-extent extraction unit 110 then supplies the shared-extent extraction unit 120 with information indicating the reach extent from C1 and information indicating the reach extent from C2.

The shared-extent extraction unit 120 extracts an extent that is shared between the supplied two extents. As illustrated in FIG. 5, the extent shared between the extent enclosed by the alternate long and short dashed line and the extent enclosed by the dashed line corresponds to an area that includes shaded elements (E11 to E14).

The shared-extent extraction unit 120 extracts an influence process of an anomaly from the extracted shared extent. For example, in FIG. 5, as for E6, which is included in the reach extent from C1, paths of E5 and E14 are assumed. Since E14 is in the shared extent, the shared-extent extraction unit 120 extracts, from E5 and E14, the path of E14 as being a path anomaly-influenced from E6. In this manner, the shared-extent extraction unit 120 is able to extract an influence process of an anomaly by using the extracted shared extent.

The extent to be extracted as the shared extent by the shared-extent extraction unit 120 may include a plurality of elements or a single element. In addition, when the shared extent includes the plurality of elements, the shared-extent extraction unit 120 may also extract edges linking each of the elements as being the shared extent.

In the present exemplary embodiment, the description has been made using an example in which there are two locations on a relationship graph where anomalies have been detected, but the present invention is not limited to this example. There may be a plurality of locations on the relationship graph where anomalies have been detected. In addition, in the present exemplary embodiment, the description has been made using an example in which locations on the relationship graph where anomalies have been detected are elements, but the present invention is not limited to this example. The locations where anomalies have been detected may be edges.

(Effect)

The information processing apparatus 100 according to the present exemplary embodiment enables to more appropriately extract anomaly influence processes even if anomalies are found at a plurality of points.

The reason is that the reach-extent extraction unit 110 uses a relationship graph and location information that indicates, on the relationship graph, a plurality of locations in the system to be monitored 900 where anomalies have been detected and extracts, as a reach extent, a path in the relationship graph including a set of the elements that are directly or indirectly related to each of the plurality of locations as a source. The reason is also that the shared-extent extraction unit 120 extracts an influence process of an anomaly by extracting an extent that is shared in at least a prescribed number of paths among a plurality of paths in the relationship graph that have been extracted.

By the reach-extent extraction unit 110 extracting, with use of a relationship graph, an extent reached from each of locations in the system to be monitored 900 where anomalies have been detected, it is possible to extract which extents in the system the anomalies may have influenced.

By the shared-extent extraction unit 120 extracting the influence process of an anomaly by extracting the extent that is shared in at least the prescribed number of paths among the paths from each of a plurality of locations in the relationship graph where anomalies have been detected, it is possible to easily extract anomaly influence processes.

(Variation)

The information processing apparatus 100 according to the present exemplary embodiment has been described using an example in which reach extents reached from a plurality of locations (C1 and C2 in FIG. 5) on a relationship graph where anomalies have been detected are extracted by backtracing from the locations where the anomalies have been detected. The present invention, however, is not limited to this example. The reach-extent extraction unit 110 of the information processing apparatus 100 may extract reach extents by forwardtracing from locations where anomalies have been detected. The forwardtracing herein refers to, when a relationship graph is a directed graph, tracing directed edges in a forward direction. Hereinafter, forwardtracing is also referred to as forward search.

This makes it possible to also extract, as influence processes of anomalies, extents that may be influenced by anomalies from locations on a relationship graph where the anomalies have been detected. Consequently, the information processing apparatus 100 according to the present variation enables to more appropriately extract anomaly influence processes.

Second Exemplary Embodiment

A second exemplary embodiment of the present invention is described in detail with reference to the drawings. The same reference signs are used for members having the same functions as the members included in the drawings described in the first exemplary embodiment, and the detailed description therefor is omitted.

Figure 6:
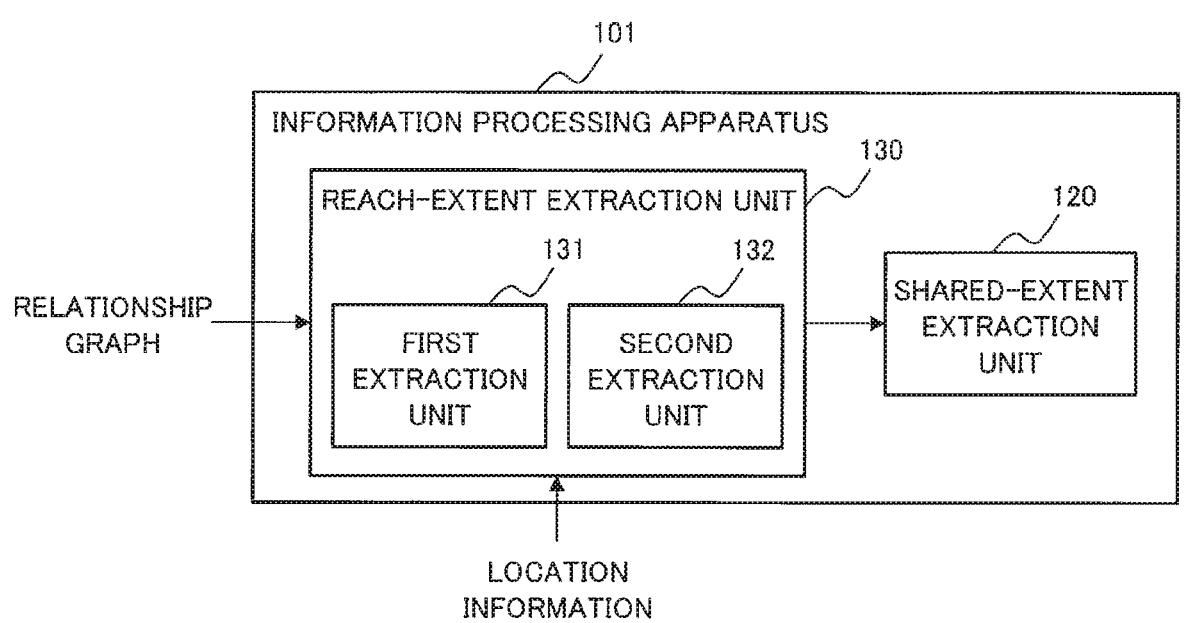
FIG. 6 is a functional block diagram illustrating an example functional configuration of an information processing apparatus according to a second exemplary embodiment of the present invention.

FIG. 6 is a functional block diagram illustrating an example functional configuration of an information processing apparatus 101 according to the present exemplary embodiment. As illustrated in FIG. 6, the information processing apparatus 101 includes a shared-extent extraction unit 120 and a reach-extent extraction unit 130. In this manner, the information processing apparatus 101 according to the present exemplary embodiment includes, as illustrated in FIG. 6, the reach-extent extraction unit 130 instead of the reach-extent extraction unit 110 of the information processing apparatus 100 according to the first exemplary embodiment.

(Reach-Extent Extraction Unit 130)

The reach-extent extraction unit 130 receives, from a not-shown external apparatus, a relationship graph representing relationships between a plurality of elements included in the system to be monitored 900 and location information that indicates, on the relationship graph, a plurality of locations in the system to be monitored 900 where anomalies have been detected.

In the first exemplary embodiment, location information indicating locations on a relationship graph where occurrence of anomalies have been detected is described using an example in which location information indicates, on a relationship graph, a plurality of locations in the system to be monitored 900 where anomalies have been detected. The present invention, however, is not limited to this example. Location information used in the present exemplary embodiment is different from the location information that is input to the information processing apparatus 100 in the first exemplary embodiment. The location information includes information (first location information) indicating, on a relationship graph, one or a plurality of locations where occurrence of anomalies have been detected and information (second location information) indicating, on a relationship graph, one or a plurality of locations detected as possible causes of anomalies. The first location information and the second location information are not limited thereto, but may be information detected as anomalies of which the contents are different from each other.

The locations on a relationship graph where occurrence of anomalies have been detected refer to, for example, locations on a relationship graph where infections with malware or the like have been detected. The locations on a relationship graph as possible causes of anomalies may refer to, for example, locations on a relationship graph that indicate elements detected as possibly having vulnerability, or may refer to locations on a relationship graph that indicate elements or the like detected as behaving differently from normal due to an attack. The reach-extent extraction unit 130 may be configured to acquire the relationship graph and the location information from another not-shown means within the information processing apparatus 101. A method for acquiring the relationship graph and the location information is not limited to particular methods.

The reach-extent extraction unit 130 includes, as illustrated in FIG. 6, a first extraction unit 131 and a second extraction unit 132. The first extraction unit 131 extracts, from one piece of the location information (for example, first location information), a reached extent on the relationship graph as being a reach extent. The second extraction unit 132 extracts, from another piece of the location information (for example, second location information), a reached extent on the relationship graph as being a reach extent by using a method different from the first location information.

Figure 7:
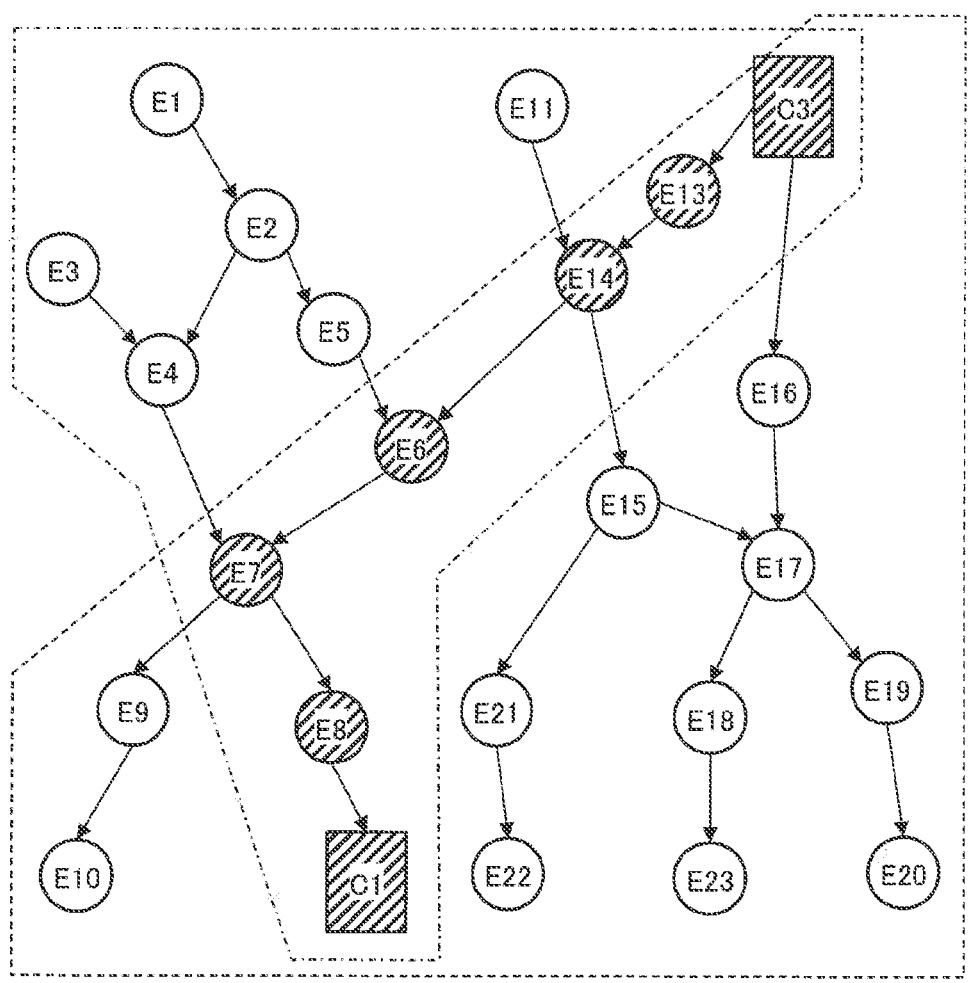
FIG. 7 is a diagram illustration the operation of the information processing apparatus according to the second exemplary embodiment of the present invention.

With reference to FIG. 7, the operation of the reach-extent extraction unit 130 of the information processing apparatus 101 is more specifically described. FIG. 7 is a diagram illustration the operation of reach-extent extraction unit 130 of the information processing apparatus 101. The diagram in FIG. 7 illustrates an example relationship graph. The relationship graph illustrated in FIG. 7 is constituted of elements indicated by vertex identifiers E1 to E11, E13 to 23, C1, and C3, and directed line segments (edges) linking the elements. For the purpose of illustration, the elements indicated by vertex identifiers E1 to E11, E13 to E23 are indicated by circles, and the elements indicated by vertex identifiers C1 and C3 are indicated by figures indicating files.

Assume that one out of one or a plurality of pieces of first location information is C1, and one out of one or a plurality of pieces of second location information is C3. The first extraction unit 131 of the reach-extent extraction unit 130 scans an extent on the relationship graph reached from C1, C1 being as a source. A method whereby the first extraction unit 131 scans an extent on the relationship graph reached from C1 is, for example, backtracing, but the present invention is not limited to this example. The first extraction unit 131 then extracts the extent enclosed by an alternate long and short dashed line in FIG. 7 as being an extent (first reach extent) reached from C1.

The second extraction unit 132 of the reach-extent extraction unit 130 scans an extent on the relationship graph reached from C3, C3 being as a source. At this time, a method whereby the second extraction unit 132 scans an extent on the relationship graph reached from C3 is, for example, forwardtracing, but the present invention is not limited to this example. The second extraction unit 132 may scan the extent by using a method different from the first extraction unit 131. The second extraction unit 132 then extracts the extent enclosed by a dashed line in FIG. 7 as being an extent (second reach extent) reached from C3.

The shared-extent extraction unit 120 then extracts, as a shared extent, an extent that is shared between the first reach extent and the second reach extent extracted by the reach-extent extraction unit 130. As illustrated in FIG. 7, the extent shared between the extent enclosed by the alternate long and short dashed line and the extent enclosed by the dashed line corresponds to an area that includes shaded elements (E6 to 8, E13, E14, C3, and C1). Accordingly, the shared-extent extraction unit 120 extracts the shaded shared extent as being an influence process of an anomaly.

In the present exemplary embodiment, a path (an influence process of an anomaly) between a location indicated on a relationship graph by first location information and a location indicated on a relationship graph by second location information is extracted by forwardtracing and backtracing, but the present invention is not limited thereto. The path may be extracted by, for example, bidirectional Dijkstra's algorithm that uses a location indicated on a relationship graph by first location information and a location indicated on a relationship graph by second location information. A method for extracting a path is not limited to particular methods.

(Effect)

The information processing apparatus 101 according to the present exemplary embodiment enables to more appropriately extract anomaly influence processes even if anomalies are found at a plurality of points.

The reason is that the reach-extent extraction unit 130 extracts, as a reach extent, a path in a relationship graph including a set of elements that are directly or indirectly related to each of the following locations (1) and (2) as a source.

(1) A location that is indicated by one or a plurality of pieces of first location information indicating, on the relationship graph, locations in the system where occurrence of anomalies have been detected.

(2) A location that is indicated by second location information indicating, on the relationship graph, one or a plurality of locations detected as being possible causes of anomalies.

In this manner, even if anomalies found at a plurality of points include different contents, the reach-extent extraction unit 130 according to the present exemplary embodiment is able to extract an extent reached from each of the locations as a source on the relationship graph where the anomalies have been detected.

The reason is also that the shared-extent extraction unit 120 extracts, as an influence process of an anomaly, a path between the locations indicated on the relationship graph by the first and second location information.

This makes it possible to extract anomaly influence processes with less man-hour.

Third Exemplary Embodiment

A third exemplary embodiment of the present invention is described in detail with reference to the drawings. The same reference signs are used for members having the same functions as the members included in the drawings described in the first and second exemplary embodiments, and the detailed description therefor is omitted.

In the present exemplary embodiment, a method for obtaining an influence process of an anomaly is described with use of a relationship graph that includes time information.

Figure 8:
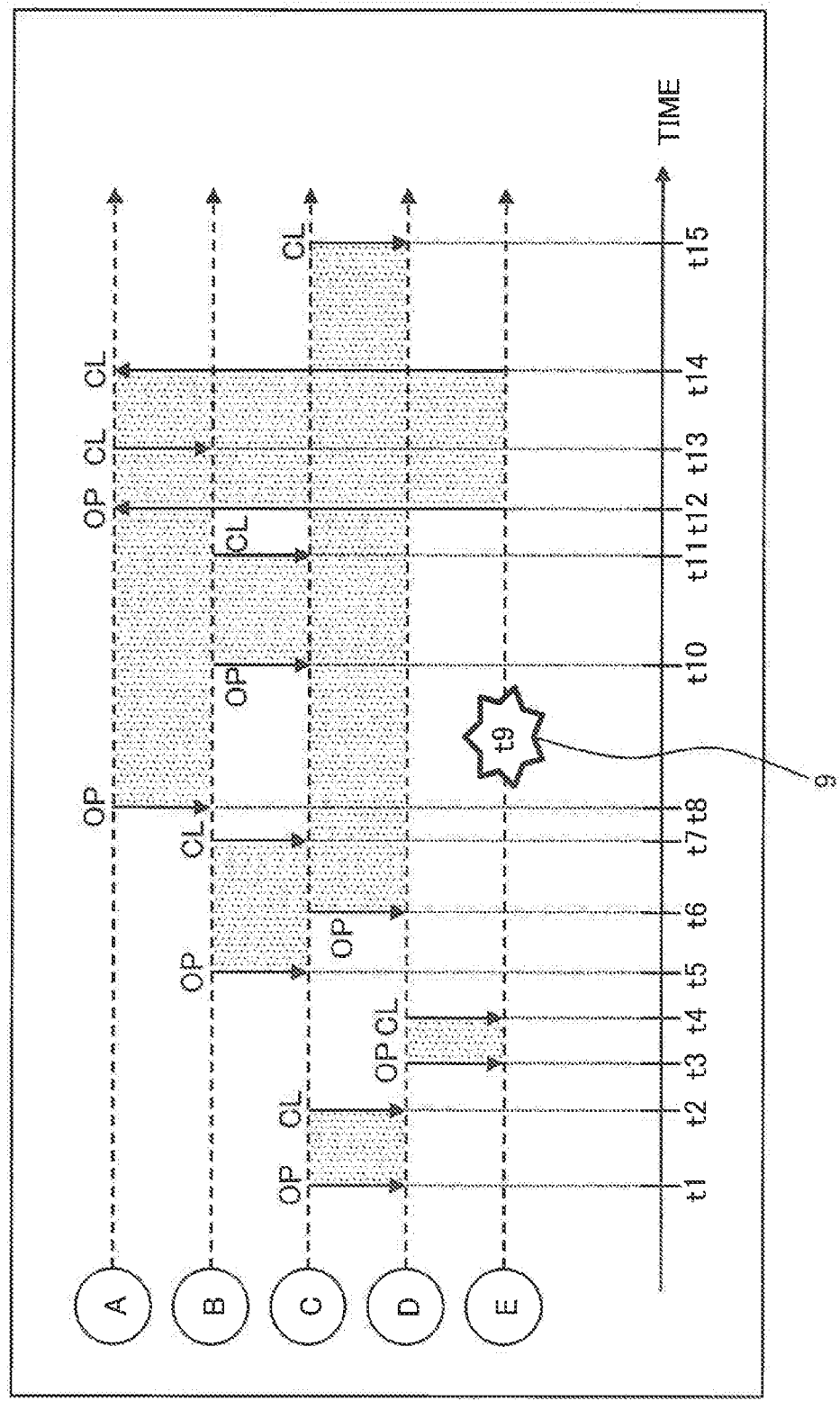
FIG. 8 is a diagram illustrating relationships with respect to a time axis between elements included in a system to be monitored according to a third exemplary embodiment of the present invention.

With reference to FIG. 8, relationships, with respect to a time axis, between elements of the system to be monitored 900 are described. FIG. 8 is a diagram illustrating relationships with respect to a time axis between elements included in the system to be monitored 900.

In FIG. 8, a horizontal axis indicates a time axis. In FIG. 8, A to E indicate vertex identifiers, and circles indicate elements represented by the vertex identifiers. "OP" indicates that a process opens from each one of the elements to another, whereas "CL" indicates that the process closes. That is, one element and another element have a relationship from open to close.

As illustrated in FIG. 8, the element having vertex identifier "C" (hereinafter referred to as element (C)) has a relationship with respect to element (D) between "t1" and "t2" and between "t6" and "t15". Similarly, element (D) has a relationship with respect to element (E) between "t3" and "t4". Element (E) has a relationship with respect to element (A) between "t12" and "t14". Element (A) has a relationship with respect to element (B) between "t8" and "t13". Element (B) has a relationship with respect to element (C) between "t5" and "t7" and between "t10" and "t11".

Figure 9:
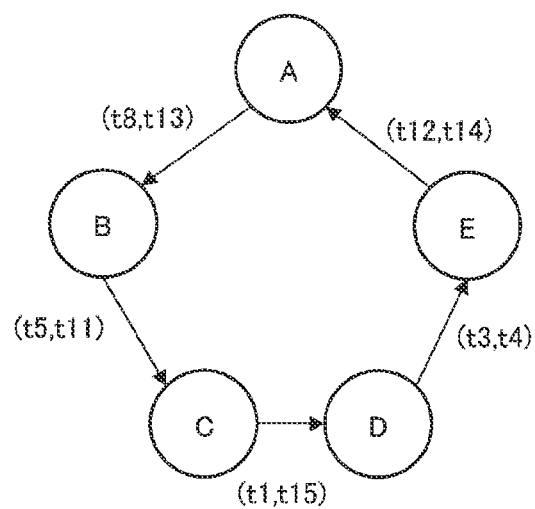
FIG. 9 is a diagram illustrating an example relationship graph used in an information processing apparatus according to the third exemplary embodiment of the present invention.

Consequently, a relationship graph used in an information processing apparatus 102 according to the present exemplary embodiment has, as illustrated in FIG. 9, time information (first time information) as attributes of edges. The time information indicated as an attribute of each edge includes a time at which a first process opens and a time at which a last process closes from one element to another element. For example, the edge from element (C) to element (D) includes time "t1" at which the first process opens and time "t15" at which the last process closes. In FIG. 9, time "t1" at which the first process opens and time "t15" at which the last process closes are denoted by (t1, t15). In this manner, a time at which a first process between elements opens is also referred to as $t_{first}$, and a time at which a last process closes is also referred to as $t_{last}$. In the present exemplary embodiment, attribute information of each edge is represented by ($t_{first}$, $t_{last}$).

Figure 10:
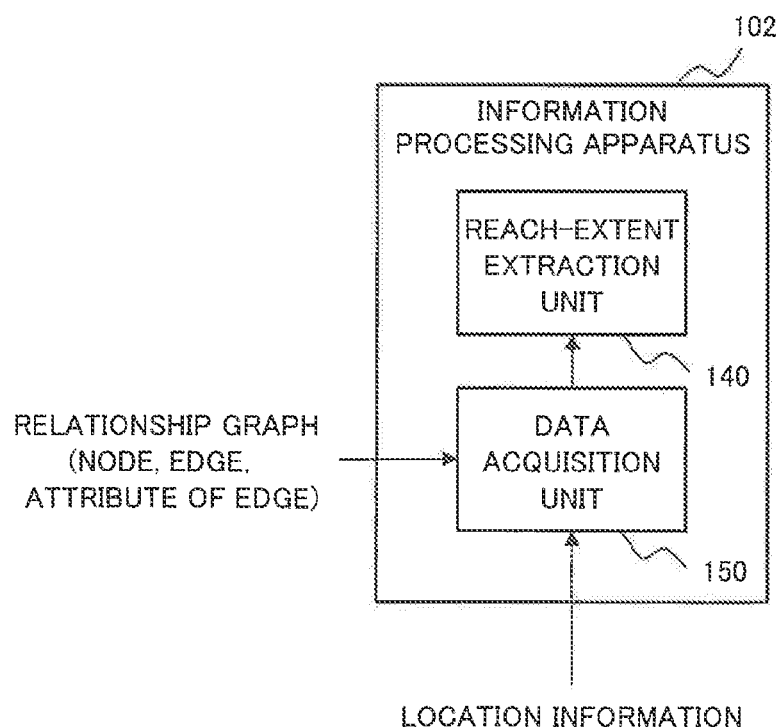
FIG. 10 is a functional block diagram illustrating an example functional configuration of the information processing apparatus according to the third exemplary embodiment of the present invention.

With use of such a relationship graph, the information processing apparatus 102 that extracts an influence process of an anomaly is described. FIG. 10 is a functional block diagram illustrating an example functional configuration of the information processing apparatus 102 according to the present exemplary embodiment. As illustrated in FIG. 10, the information processing apparatus 102 according to the present exemplary embodiment includes a reach-extent extraction unit 140 and a data acquisition unit 150. In this manner, the information processing apparatus 102 according to the present exemplary embodiment is configured to include, as illustrated in FIG. 10, the reach-extent extraction unit 140 and the data acquisition unit 150 instead of the reach-extent extraction unit 110 of the information processing apparatus 100 according to the first exemplary embodiment, and not to include the shared-extent extraction unit 120.

The data acquisition unit 150 acquires, from a not-shown external apparatus, a relationship graph representing relationships between a plurality of elements included in the system to be monitored 900 and location information that indicates, on the relationship graph, a plurality of locations in the system to be monitored 900 where anomalies have been detected. The data acquisition unit 150 may be configured to acquire the relationship graph and the location information from another not-shown means within the information processing apparatus 102. A method for acquiring the relationship graph and the location information is not limited to particular methods. The relationship graph has, as described above, time information as attributes of each edge. The location information includes information (second time information) indicating a time at which an anomaly has been detected.

The data acquisition unit 150 is the function included in the above-described reach-extent extraction unit 110 or the reach-extent extraction unit 130.

The data acquisition unit 150 supplies the reach-extent extraction unit 140 with the acquired relationship graph and the location information.

The reach-extent extraction unit 140 receives the relationship graph and the location information from the data acquisition unit 150. The reach-extent extraction unit 140 extracts, based on the time at which the anomaly has been detected included in the location information, a path (reach extent) in the relationship graph reached from the location as a source indicated on the relationship graph by the location information that includes information indicating the time.

With reference to FIG. 8 and FIG. 9, the operation of the reach-extent extraction unit 140 of the information processing apparatus 102 is more specifically described. The case in which the reach-extent extraction unit 140 receives the relationship graph as illustrated in FIG. 9 and the location information that indicates element (E) including time "t9" is described.

Time "t9" is, as illustrated by a heptagon star (position denoted by reference sign 9) in FIG. 8, a time posterior to t8 and prior to t10.

Firstly, the reach-extent extraction unit 140 performs backward search and forward search from the location as a source at time t9 on element (E) indicated on the relationship graph by the location information. In the present exemplary embodiment, an edge between elements is denoted by, for example, edge (D, E). A first element within a parenthesis indicates a vertex identifier of an element at a source of a directed arrow, whereas a second element indicates a vertex identifier of an element at a destination of a directed arrow.

In backward search, the reach-extent extraction unit 140 firstly obtains a currently-acquirable oldest time (referred to as a minimum value of time). The currently-acquirable oldest time indicates a last time that was influenceable with respect to a detected anomaly. Hereinafter, the current minimum value is referred to as $t_{min}$. An initial value therefor is a time indicated by the location information. Thus, the initial value for the minimum value ($t_{min}$) is t9.

Next, the reach-extent extraction unit 140 confirms whether a first element ($t_{first}$) of attribute information of an edge to be searched is prior to the time included in the location information (i.e., the current minimum value (=$t_{min}$)). Hereinafter, an inequality sign is used to denote as "confirms whether "$t_{first} < G_{min}$" is satisfied". The attribute information of edge (D, E) is, as illustrated in FIG. 9, (t3, t4). Thus, $t_{first}$ of edge (D, E) is t3. Since t3<t9 is satisfied, the reach-extent extraction unit 140 determines that element (D) has a relationship with element (E) and regards element (D) as a backward search target.

Next, the reach-extent extraction unit 140 obtains the last time that was influenceable by element (D) with respect to the detected anomaly. That is, the reach-extent extraction unit 140 obtains a new minimum value ($t_{min}$) using MIN($t_{min}$, $t_{last}$). MIN(x, y) is a function that returns the smaller value of the elements within the parenthesis. Since MIN(t9, t4)=t4, the new minimum value ($t_{min}$) becomes $t_{min}$=t4.

Next, the reach-extent extraction unit 140 confirms whether $t_{first} < t_{min}$ is satisfied regarding edge (C, D). Since t1<t4 is satisfied, the reach-extent extraction unit 140 determines that element (C) has a relationship with element (D) and regards element (C) as a backward search target. The reach-extent extraction unit 140 then obtains a new minimum value using MIN($t_{min}$, $t_{last}$). From MIN(t4, t15), the new minimum value becomes $t_{min}$=t4.

Similarly, the reach-extent extraction unit 140 confirms whether $t_{first} < t_{min}$ is satisfied regarding edge (B, C). Since t5>t4 and the aforementioned condition is not satisfied, the reach-extent extraction unit 140 does not regard element (B) as a backward search target. Consequently, the reach-extent extraction unit 140 ends backward search.

Next, forward search performed by the reach-extent extraction unit 140 is described. In forward search, the reach-extent extraction unit 140 firstly obtains a currently-acquirable newest time (referred to as a maximum value of time). The currently-acquirable newest time indicates a first time that was influenceable with respect to a detected anomaly. Hereinafter, the current maximum value is referred to as $t_{max}$. An initial value therefor is a time indicated by the location information. Thus, the initial value for the maximum value ($t_{max}$) is t9.

Figure 11:
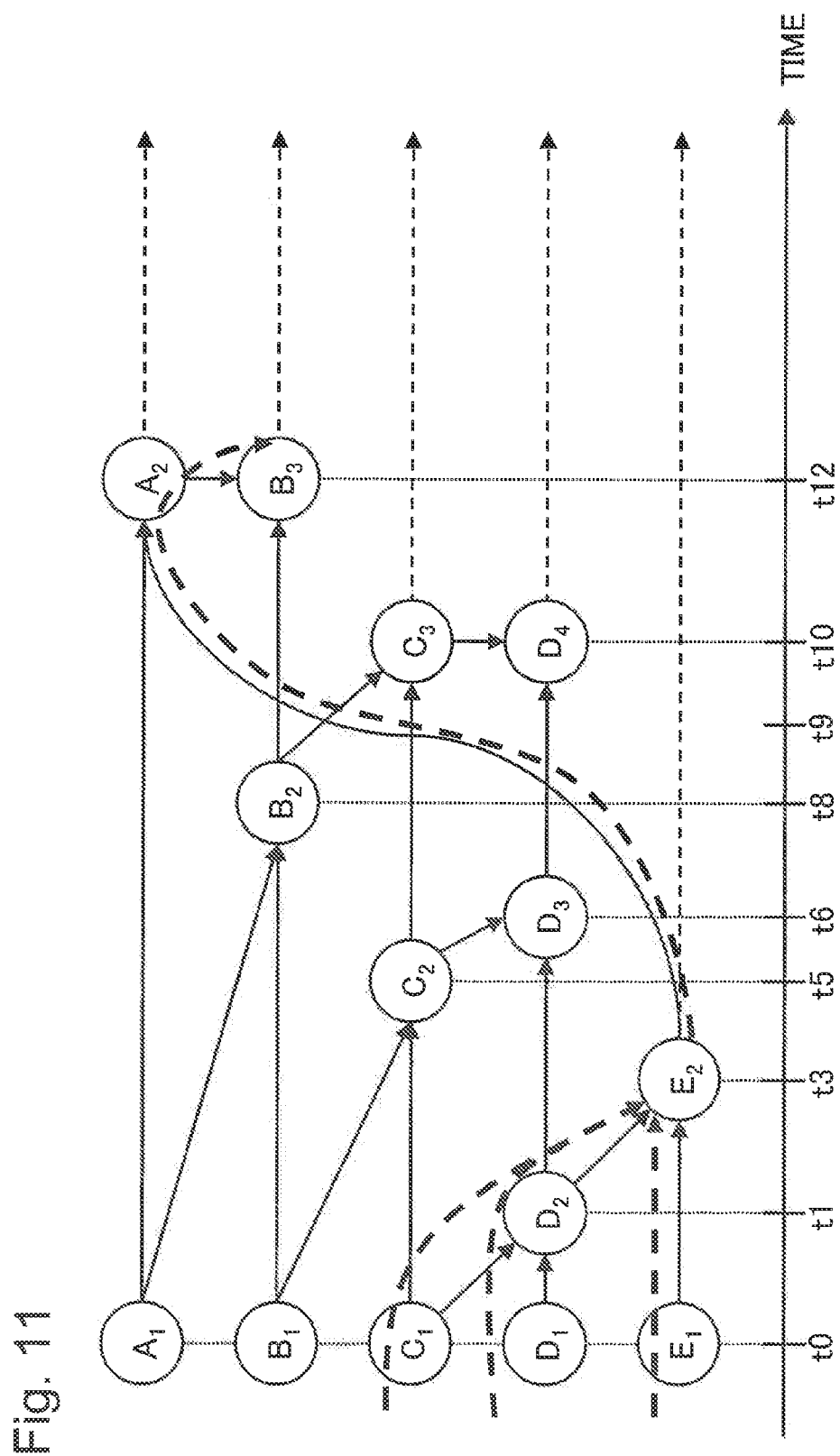
FIG. 11 is a diagram illustrating an example relationship graph used in an information processing apparatus according to a variation of the third exemplary embodiment of the present invention.

Next, the reach-extent extraction unit 140 confirms whether a second element ($t_{last}$) of attribute information of an edge to be searched is posterior to the time included in the location information (the current maximum value (=$t_{max}$)). Hereinafter, an inequality sign is used to denote as "confirms whether "$t_{max}<t_{last}$" is satisfied". The attribute information of edge (E, A) is, as illustrated in FIG. 11, (t12, t14). Thus, bast of edge (E, A) is t14. Since t9<t14 is satisfied, the reach-extent extraction unit 140 determines that element (E) has a relationship with element (A) and regards element (A) as a forward search target.

Next, the reach-extent extraction unit 140 obtains the first time that was influenceable by element (A) with respect to the detected anomaly. That is, the reach-extent extraction unit 140 obtains a new maximum value ($t_{max}$) using MAX ($t_{max}$, $t_{first}$). MAX(x, y) is a function that returns the larger value of the elements within the parenthesis. Since MAX(t9, t12)=t12, the new maximum value ($t_{max}$) becomes $t_{max}$=t12.

Next, the reach-extent extraction unit 140 confirms whether $t_{max}<t_{last}$ is satisfied regarding edge (A, B). Since t12<t13 is satisfied, the reach-extent extraction unit 140 determines that element (A) has a relationship with element (B) and regards element (B) as a forward search target. Then, a new maximum value is obtained using MAX($t_{max}$, $t_{first}$). From MAX(t12, t8), the new maximum value becomes $t_{max}$=t12.

Similarly, the reach-extent extraction unit 140 confirms whether $t_{max}<t_{last}$ is satisfied regarding edge (B, C). Since t12>t11 and the aforementioned condition is not satisfied, the reach-extent extraction unit 140 does not regard element (C) as a forward search target. Consequently, the reach-extent extraction unit 140 ends forward search.

The reach-extent extraction unit 140 extracts, as an influence process of an anomaly, a path in the relationship graph extracted through forward search and backward search as described above for each of the locations indicated on the relationship graph by the location information.

In the present exemplary embodiment, the description has been made about that the reach-extent extraction unit 140 performs forward search after performing backward search, but the present invention is not limited thereto. The reach-extent extraction unit 140 may perform backward search and forward search at the same time, or may perform backward search after forward search.

(Effect)

The information processing apparatus 102 according to the present exemplary embodiment enables to more appropriately extract anomaly influence processes. By extracting an influence process of an anomaly with use of time information, the information processing apparatus 102 is able to reduce search time for anomaly influence processes.

Consequently, it is made possible to extract anomaly influence processes with less man-hour.

As a second object of the present invention, there is further a problem in that the technique described in PTL 1 or 2 may cover an inadequate or too large extent of an anomaly to be identified. The reason is that the technique described in PTL 1 or 2 does not consider the dependence of services or equipment where an anomaly has been detected at the point in time when the anomaly has been detected.

That is, the techniques described in PTL 1 and 2 may extract, as an anomaly influence process, services, equipment or the like that have no dependence on the services or equipment where an anomaly has been detected at the point in time when the anomaly has been detected, even if a system has dependence as a whole. Thus, it is required to more appropriately identify anomaly influence processes.

The information processing apparatus 102 according to the present exemplary embodiment can also solve the above-mentioned problem.

(Variation 1)

A Variation 1 according to the present exemplary embodiment is described with reference to FIG. 11. FIG. 11 is a diagram illustrating an example relationship graph used in an information processing apparatus 102 according to the present variation. The information processing apparatus 102 according to the present variation has the same functional configuration as the information processing apparatus 102 illustrated in FIG. 10, and thus the description therefor is omitted.

In the third exemplary embodiment, a configuration in which a relationship graph used in the information processing apparatus 102 includes time information as attributes of edges is described, but the present invention is not limited thereto. The time information may be configured to be included as attributes of elements.

The relationship graph illustrated in FIG. 11 includes the information described using FIG. 8. Firstly, in FIG. 11, there are shown a plurality of vertices ($A_1$, $B_1$, $C_1$, $D_1$, $E_1$) generated at time t0 (initial state). Each of the vertices is generated when a process opens from another element. In other words, every time element M newly becomes a state of being able to influence another element N, vertex $N_{j+1}$ is generated that has directed edges from vertices $M_i$ and $N_j$ representing a state of M and a state of N at a point in time, respectively, and that represents a new state of element N. i and j are natural numbers. For example, in FIG. 8, a process from element (C) to element (D) opens at time "t1". Thus, as illustrated in FIG. 11, the relationship graph includes vertex $D_2$ at a position of time "t1". Further, the relationship graph includes edges (the edge from $C_1$ to $D_2$ and the edge from $D_1$ to $D_2$) indicating relationships between the vertices.

At time "t10", vertex ($C_3$) and vertex ($D_4$) are newly generated. As illustrated in FIG. 8, at time "t10", a process newly opens from element (B) to element (C). Thus, the relationship graph illustrated in FIG. 11 includes vertex ($C_3$) having information of time "t10". The process from element (C) to element (D) is still ongoing at a point in time "t10". Accordingly, the process from element (C) to element (D) may be influenced by the process from element (B) to element (C). Accordingly, the relationship graph illustrated in FIG. 11 includes vertex ($D_4$) at time "t10" that is the same as the time including vertex ($C_3$).

With use of a relationship graph including such information, the reach-extent extraction unit 140 extracts, as an influence process of an anomaly, a path in the relationship graph reached from a location as a source indicated on the relationship graph by location information and time.

With reference to FIG. 11, the operation of the reach-extent extraction unit 140 of the information processing apparatus 102 is more specifically described. The case in which the reach-extent extraction unit 140 receives the relationship graph as illustrated in FIG. 11 and the location information that indicates vertex ($E_2$) including time "t9" is described.

Firstly, the reach-extent extraction unit 140 performs backward search from a position of vertex ($E_2$) as a source.

A path associated with vertex ($E_2$) corresponds to a path represented by bold dashed arrows (the paths from $C_1$ to $D_2$, from $D_1$ to $D_2$, from $D_2$ to $E_2$, and from $E_1$ to $E_2$) in FIG. 11. Thus, the reach-extent extraction unit 140 extracts the paths as a result of backward search.

Next, the reach-extent extraction unit 140 performs forward search from a position of vertex ($E_2$) as a source. A path associated with vertex ($E_2$) corresponds to a path represented by bold dashed arrows (the paths from $E_2$ to $A_2$ and from $A_2$ to $B_3$) in FIG. 11. Thus, the reach-extent extraction unit 140 extracts the path as a result of forward search.

The reach-extent extraction unit 140 extracts, as an influence process of an anomaly, paths in a relationship graph extracted through forward search and backward search as described above for each of the locations indicated on the relationship graph by the location information.

In the present variation, the description has been made about that the reach-extent extraction unit 140 performs forward search after performing backward search, but the present invention is not limited thereto. The reach-extent extraction unit 140 may perform backward search and forward search at the same time, or may perform backward search after forward search.

In this manner, the information processing apparatus 102 according to the present variation 1 enables to more appropriately extract, even with use of the relationship graph as illustrated in FIG. 11, anomaly influence processes similarly to the third exemplary embodiment. Accordingly, similarly to the second exemplary embodiment, it is made possible to extract anomaly influence processes with less man-hour.

The way a relationship graph holds time information and the method of search with use of the same described above is exemplary, and the present invention is not limited thereto.

(Variation 2)

Figure 12:
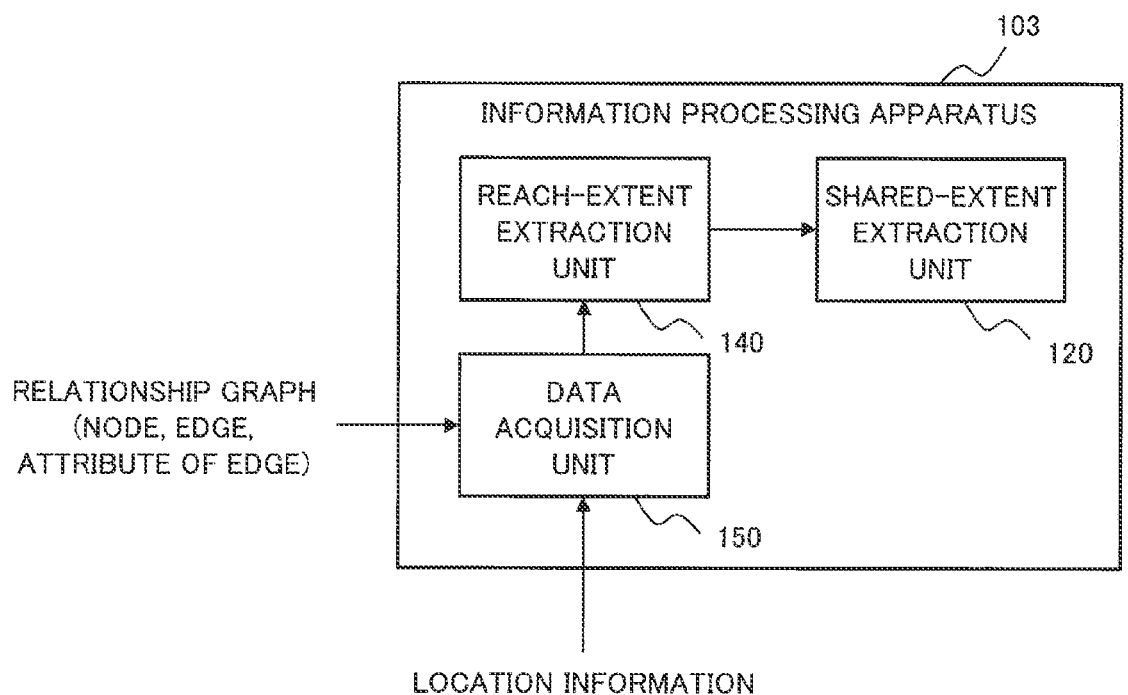
FIG. 12 is a functional block diagram illustrating an example functional configuration of an information processing apparatus according to a variation of the third exemplary embodiment of the present invention.

A variation 2 according to the present exemplary embodiment is described with reference to FIG. 12. FIG. 12 is a functional block diagram illustrating a functional configuration of an information processing apparatus 103 according to the present variation. The same reference signs are used for members having the same functions as the members included in the drawings described in the first through third exemplary embodiments, and the detailed description therefor is omitted.

The information processing apparatus 103 according to the present variation includes, as illustrated in FIG. 12, a shared-extent extraction unit 120, a reach-extent extraction unit 140, and a data acquisition unit 150. As illustrated in FIG. 12, the information processing apparatus 103 according to the present variation is configured to include the shared-extent extraction unit 120 additionally to the information processing apparatus 102 described in the third exemplary embodiment.

The reach-extent extraction unit 140 of the information processing apparatus 103 extracts, as a reach extent, a path in a relationship graph extracted through forward search and backward search described in the third exemplary embodiment for each of locations indicated on the relationship graph by location information. Then, the shared-extent extraction unit 120 is supplied with the extracted reach extents for each of the plurality of locations on the relationship graph where anomalies have been detected.

The shared-extent extraction unit 120 extracts, similarly to the first and second exemplary embodiments, an extent that is shared among at least prescribed number of the reach extents by using the reach extents extracted by the reach-extent extraction unit 140 for each of the plurality of location on the relationship graph. The shared-extent extraction unit 120 is able to extract the extracted extent as being an influence process of an anomaly.

In this manner, the configuration of the information processing apparatus 103 according to the present variation enables to achieve the effect similar to the first through third exemplary embodiments.

Fourth Exemplary Embodiment

A fourth exemplary embodiment of the present invention is described in detail with reference to the drawings. The same reference signs are used for members having the same functions as the members included in the drawings described in the first through third exemplary embodiments, and the detailed description therefor is omitted.

Figure 13:
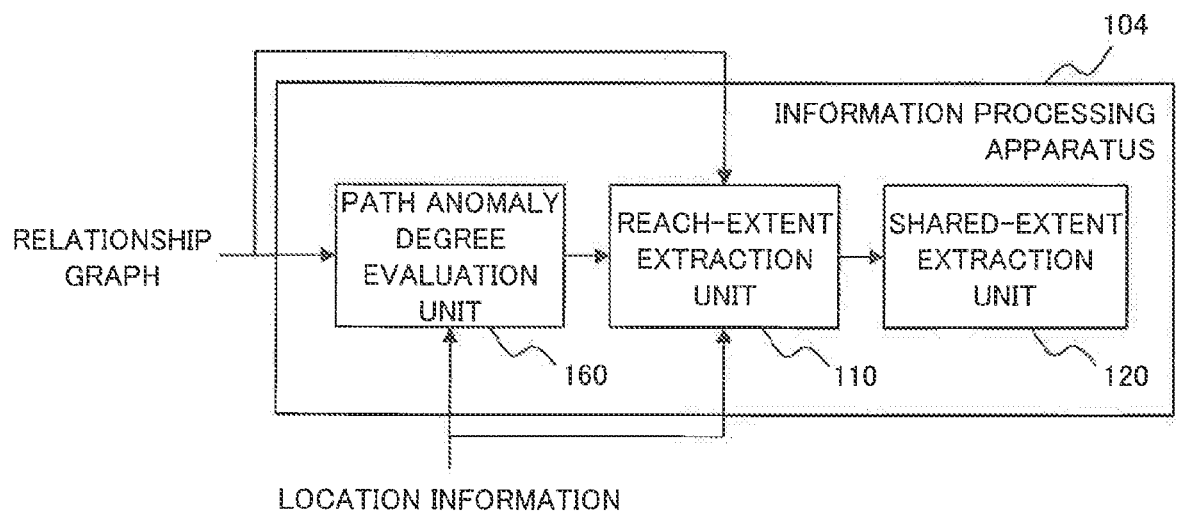
FIG. 13 is a functional block diagram illustrating an example functional configuration of an information processing apparatus according to a fourth exemplary embodiment of the present invention.

FIG. 13 is a functional block diagram illustrating an example functional configuration of an information processing apparatus 104 according to the present exemplary embodiment. As illustrated in FIG. 13, the information processing apparatus 104 includes a reach-extent extraction unit 110, a shared-extent extraction unit 120, and a path anomaly degree evaluation unit 160. The information processing apparatus 104 illustrated in FIG. 13 is configured to include the path anomaly degree evaluation unit 160 additionally to the information processing apparatus 100 in the first exemplary embodiment, but may be configured to include the path anomaly degree evaluation unit 160 additionally to the information processing apparatus in the other exemplary embodiment.

(Path Anomaly Degree Evaluation Unit 160)

The path anomaly degree evaluation unit 160 receives, from a not-shown external apparatus, a relationship graph representing relationships between a plurality of elements included in the system to be monitored 900. The path anomaly degree evaluation unit 160 may be configured to acquire the relationship graph from another not-shown means within the information processing apparatus 104. A method for acquiring the relationship graph is not limited to particular methods.

The relationship graph acquired by the path anomaly degree evaluation unit 160 includes anomaly degrees of edges (for example, weight) as attributes of the edges. For example, when elements having no relationship in a normal operation are connected by an edge on an acquired relationship graph, the edge includes a high anomaly degree as an attribute of the edge. An edge that connects elements having a relationship in a normal operation includes a low anomaly degree as an attribute of the edge. The path anomaly degree evaluation unit 160 acquires a relationship graph including such attributes of edges. The anomaly degrees may be given to nodes, without limitation to edges.

The path anomaly degree evaluation unit 160 acquires location information that indicates, on the relationship graph, locations in the system to be monitored 900 where anomalies have been detected.

The path anomaly degree evaluation unit 160 evaluates, from the acquired relationship graph and the location information, an anomaly degree of a path from each of the locations as a source indicated on the relationship graph by the location information. The path anomaly degree evaluation unit 160 generates information that indicates the anomaly degrees of the paths as a result of evaluation (evaluation result), and supplies the reach-extent extraction unit 110 with the information.

The description has been made using an example in which a relationship graph includes anomaly degrees of edges as attributes of the edges, but the present invention is not limited to this example. The path anomaly degree evaluation unit 160 may be configured to acquire anomaly degrees of edges separately from a relationship graph.

The path anomaly degree evaluation unit 160 may be configured to calculate an anomaly degree of an edge for each of the edges. The path anomaly degree evaluation unit 160, for example, finds a sum of distances of edges and divides the sum of the distances of the edges by a total number of the edges to obtain a threshold value, and evaluates an edge with a longer distance than the threshold value as having a high anomaly degree and evaluates an edge with a shorter distance as having a low anomaly degree. The threshold value may be a predetermined value.

A method whereby the path anomaly degree evaluation unit 160 evaluates anomaly degrees of paths is not limited thereto. The path anomaly degree evaluation unit 160 may evaluate anomaly degrees of edges, for example, by determining whether a number of times of occurrence of relationships between elements represented by the edges is smaller than a prescribed threshold value. The threshold value may be a number obtained by dividing a sum of the number of times by a total number of the edges.

In this manner, the path anomaly degree evaluation unit 160 supplies the reach-extent extraction unit 110 with information (evaluation result) for increasing the efficiency of search to be performed by the reach-extent extraction unit 110.

The reach-extent extraction unit 110 extracts a reach extent using the evaluation result supplied from the path anomaly degree evaluation unit 160, the acquired relationship graph, and the acquired location information. At this time, the reach-extent extraction unit 110 extracts a path having a high anomaly degree as a reach extent based on the evaluation result. A method whereby the reach-extent extraction unit 110 extracts a reach extent may be, for example, a method whereby anomaly degrees of edges in a path in the relationship graph are accumulated from each of the locations indicated on the relationship graph by the location information and a path having a higher accumulated value than a prescribed value is extracted, or may be another method. For example, the reach-extent extraction unit 110 may find an average value of anomaly degrees and may extract a path having an edge with a higher anomaly degree than the average value.

The reach-extent extraction unit 110 then supplies the shared-extent extraction unit 120 with the extracted reach extent. At this time, the reach-extent extraction unit 110 may supply the shared-extent extraction unit 120 with the evaluation result acquired from the path anomaly degree evaluation unit 160.

The shared-extent extraction unit 120 may extract a shared extent using the evaluation result supplied from the reach-extent extraction unit 110 and the reach extent. In this manner, the shared-extent extraction unit 120 is able to extract an influence process reflecting anomaly degrees. The shared-extent extraction unit 120 may output the supplied evaluation result together with the extracted influence process.

(Effect)

The information processing apparatus 104 according to the present exemplary embodiment enables to more appropriately extract anomaly influence processes. The reason is that the path anomaly degree evaluation unit 160 evaluates anomaly degrees of paths in a relationship graph and generates an evaluation result.

Consequently, the reach-extent extraction unit 110 extracts a reach extent by using the evaluation result, thereby enabling to extract a more appropriate reach extent.

The shared-extent extraction unit 120 extracts an influence process of an anomaly by using the evaluation result, thereby enabling to extract influence processes more reflecting anomaly degrees.

(Hardware Configuration)

Figure 14:
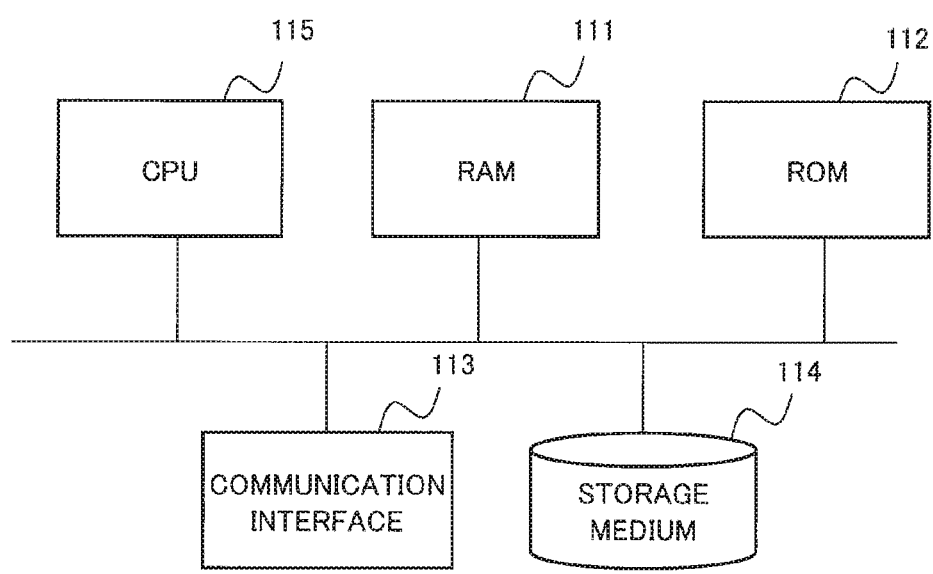
FIG. 14 is a diagram illustrating an example hardware configuration of the information processing apparatus capable of implementing an information processing system according to each of the exemplary embodiments of the present invention.

Each unit of the information processing apparatuses illustrated in FIGS. 1, 6, 10, 12, and 13 may be implemented by hardware resources exemplified in FIG. 14. Namely, a configuration illustrated in FIG. 14 includes a Random Access Memory (RAM) 111, a Read Only Memory (ROM) 112, a communication interface 113, a storage medium 114, and a Central Processing Unit (CPU) 115. The CPU 115 governs the overall operations of the information processing apparatus by reading out various software programs (computer programs) stored in the ROM 112 or the storage medium 114 to the RAM 111 and executing the programs. Namely, in each of the exemplary embodiments, the CPU 115 executes software programs for executing the functions (units) included in the information processing apparatus while referring to the ROM 112 or the storage medium 114 as appropriate.

The present invention having been described using each of the exemplary embodiments as an example is accomplished by supplying the information processing apparatus with computer programs capable of realizing the above-described functions, and thereafter, reading out the computer programs to the RAM 111 and executing the computer programs by the CPU 115.

The supplied computer programs may be stored in a readable/writable memory (temporary storage medium), or in a computer-readable storage device, such as a hard disk apparatus. In such a case, it can be grasped that the present invention is constituted of a storage medium that stores codes representing the computer programs or the computer programs.

In each of the above-described exemplary embodiments, the description has been made about the case in which the functions indicated in the blocks of each of the information processing apparatuses illustrated in FIGS. 1, 6, 10, 12, and 13 are implemented by software programs, as an example executed by the CPU 115 illustrated in FIG. 14. However, a part or all of the functions indicated in the blocks illustrated in FIGS. 1, 6, 10, 12, and 13 may be implemented as hardware circuits.

Each of the above-described exemplary embodiments is a preferable exemplary embodiment of the present invention, and is not intended to limit the scope of the present invention. A person skilled in the art can construct a form by making various modifications to the exemplary embodiments by means of correction or substitution without departing from the gist of the present invention.

This application is based upon and claims the benefit of priority from Japanese Patent Application No. 2014-058558, filed on Mar. 20, 2014, the disclosure of which is incorporated herein in its entirety by reference.

REFERENCE SIGNS LIST

1 Information processing system
100 Information processing apparatus
101 Information processing apparatus
102 Information processing apparatus
103 Information processing apparatus
104 Information processing apparatus 110 Reach-extent extraction unit
120 Shared-extent extraction unit
130 Reach-extent extraction unit
131 First extraction unit
132 Second extraction unit
140 Reach-extent extraction unit
150 Data acquisition unit
160 Path anomaly degree evaluation unit
900 System to be monitored
920 Element

The invention claimed is:

1. An information processing apparatus comprising:
a memory storing a program; and
at least one processor configured to run the program to execute:
extracting, with use of a relationship graph representing relationships between a plurality of elements included in a system and location information that indicates, on the relationship graph, a plurality of locations where anomalies have been detected in the system, paths reached from a plurality of the locations on the relationship graph, the locations where the anomalies have been detected by backtracing, that is tracing directed edges of the relationship graph in backward direction and forwardtracing, that is tracing directed edges of the relationship graph in forward direction, the paths including a set of the elements that are directly or indirectly related to each of the locations as a source; and
extracting a shared extent that is an element, an edge, or a set of elements or edges, the element, the edge or the set of elements or edges being shared by at least prescribed number of paths among the paths extracted, as an influence process of the anomalies.

2. The information processing apparatus according to claim 1,
wherein the location information includes a plurality of pieces of first location information indicating, on the relationship graph, locations in the system where occurrence of anomalies has been detected, and
the at least one processor is configured to run the program to execute extracting a reach extent from each of the locations indicated on the relationship graph by the plurality of pieces of first location information.

3. The information processing apparatus according to claim 1,
wherein the location information includes one or a plurality of pieces of first location information indicating, on the relationship graph, locations in the system where occurrence of anomalies has been detected and second location information indicating, on the relationship graph, one or a plurality of locations detected as being possible causes of anomalies,
wherein the at least one processor is configured to run the program to execute extracting, as a first reach extent, a path in the relationship graph including the set of elements that are directly or indirectly related to the location as a source indicated on the relationship graph by the first location information, and extracting, as a second reach extent, a path in the relationship graph including the set of elements that are directly or indirectly related to the location as a source indicated on the relationship graph by the second location information, and
extracting, as the influence process of the anomaly, a path between the location indicated on the relationship graph by the first location information and the location indicated on the relationship graph by the second location information.

4. The information processing apparatus according to claim 1,
wherein the relationship graph includes first time information as attributes of at least one of the elements and edges,
wherein the location information includes second time information indicating a time at which the anomaly has been detected, and
wherein the at least one processor is configured to run the program to execute extracting, as the reach extent, a path in the relationship graph reached from the location as a source indicated on the relationship graph by the location information that includes the second time information, based on the time at which the anomaly has been detected indicated by the second time information.

5. The information processing apparatus according to claim 4,
wherein, when the first time information refers to the attributes of the elements, the at least one processor is configured to run the program to execute extracting a path in the relationship graph reached from the location indicated on the relationship graph by the location information by performing at least one of (i) a first search for searching a time prior to the time at which the anomaly has been detected and (ii) a second search for searching a time posterior to the time at which the anomaly has been detected.

6. The information processing apparatus according to claim 5,
wherein the first time information includes, for each edge, a start time at which an element connected at one end of the edge has first influenced an element connected at another end and a finish time at which an element connected at one end of the edge has last influenced an element connected at another end, and
wherein the first search compares a currently-acquirable oldest time with the finish time and determines an older one as the oldest time, and, when the start time is a time prior to the oldest time, causes the element connected at the one end of the edge that includes the start time to be included in the reach extent, whereas when the start time is a time posterior to the oldest time, causes the element connected at the one end of the edge that includes the start time not to be included in the reach extent.

7. The information processing apparatus according to claim 5,
wherein the first time information includes, for each edge, a start time at which an element connected at one end of the edge has first influenced an element connected at another end and a finish time at which an element connected at one end of the edge has last influenced an element connected at another end, and
wherein the second search compares a currently-acquirable newest time with the start time and determines a newer one as the newest time, and, when the finish time is a time posterior to the newest time, causes the element connected at the other end of the edge that includes the finish time to be included in the reach extent, whereas when the finish time is a time prior to the newest time, causes the element connected at the other end of the edge that includes the finish time not to be included in the reach extent.

8. The information processing apparatus according to claim 1,
wherein the relationship graph includes vertices including first time information that are generated every time an element becomes a state of being able to influence another element,
wherein the location information includes second time information indicating a time at which the anomaly has been detected, and
wherein the at least one processor is configured to run the program to execute extracting, as the reach extent, a path in the relationship graph reached from the location as a source indicated on the relationship graph by the location information that includes the second time information, based on the time at which the anomaly has been detected indicated by the second time information.

9. The information processing apparatus according to claim 1, wherein the at least one processor is configured to run the program to execute evaluating anomaly degrees of paths in the relationship graph and generate an evaluation result, and
extract the reach extent using the evaluation result.

10. The information processing apparatus according to claim 9, wherein the at least one processor is configured to run the program to execute extracting the influence process of the anomaly using the evaluation result.

11. An information processing apparatus comprising:
a memory storing a program; and
at least one processor configured to run the program to execute:
acquiring a relationship graph representing relationships between a plurality of elements included in a system and location information that indicates, on the relationship graph, a plurality of locations where anomalies have been detected in the system;
extracting, with use of the relationship graph and the location information acquired, as an influence process of an anomaly, paths reached from a plurality of the locations on the relationship graph, the locations where the anomalies have been detected by backtracing, that is tracing directed edges of the relationship graph in backward direction and forwardtracing, that is tracing directed edges of the relationship graph in forward direction, the paths in the relationship graph including a set of elements that are directly or indirectly related to each of the locations as a source; and
extracting a shared extent that is an element, an edge, or a set of elements or edges, the element, the edge or the set of edges being shared by at least a prescribed number of paths among the paths extracted, as an influence process of the anomalies.

12. The information processing apparatus according to claim 11,
wherein the relationship graph includes first time information as attributes of at least one of the elements and edges,
wherein the location information includes second time information indicating a time at which the anomaly has been detected, and
wherein the at least one processor is configured to run the program to execute identifying, as an influence process of the anomaly, a path in the relationship graph reached from the location as a source indicated on the relationship graph by the location information that includes the second time information, based on the time at which the anomaly has been detected indicated by the second time information.

13. The information processing apparatus according to claim 12,
wherein, when the first time information refers to the attributes of the elements, the at least one processor is configured to run the program to execute extracting a path in the relationship graph reached from the location indicated on the relationship graph by the location information by performing at least one of (i) a first search for searching a time prior to the time at which the anomaly has been detected and (ii) a second search for searching a time posterior to the time at which the anomaly has been detected.

14. The information processing apparatus according to claim 13,
wherein the first time information includes, for each edge, a start time at which an element connected at one end of the edge has first influenced an element connected at another end and a finish time at which an element connected at one end of the edge has last influenced an element connected at another end, and
wherein the first search compares a currently-acquirable oldest time with the finish time and determines an older one as the oldest time, and, when the start time is a time prior to the oldest time, causes the element connected at the one end of the edge that includes the start time to be included in the influence process of the anomaly, whereas when the start time is a time posterior to the oldest time, causes the element connected at the one end of the edge that includes the start time not to be included in the influence process of the anomaly.

15. The information processing apparatus according to claim 13,
wherein the first time information includes, for each edge, a start time at which an element connected at one end of the edge has first influenced an element connected at another end and a finish time at which an element connected at one end of the edge has last influenced an element connected at another end, and
wherein the second search compares a currently-acquirable newest time with the start time and determines a newer one as the newest time, and, when the finish time is a time posterior to the newest time, causes the element connected at the other end of the edge that includes the finish time to be included in the influence process of the anomaly, whereas when the finish time is a time prior to the newest time, causes the element connected at the other end of the edge that includes the finish time not to be included in the influence process of the anomaly.

16. The information processing apparatus according to claim 11,
wherein the relationship graph includes vertices including first time information that are generated every time an element becomes a state of being able to influence another element,
wherein the location information includes second time information indicating a time at which the anomaly has been detected, and
wherein the at least one processor is configured to run the program to execute extracting, as the influence process of the anomaly, a path in the relationship graph reached from the location as a source indicated on the relationship graph by the location information that includes the second time information, based on the time at which the anomaly has been detected indicated by the second time information.

17. The information processing apparatus according to claim 11, wherein the at least one processor is configured to run the program to execute evaluating anomaly degrees of paths in the relationship graph and generate an evaluation result, and extracting the influence process of the anomaly using the evaluation result.

18. An influence-process extraction method for an information processing apparatus, comprising:

extracting, with use of a relationship graph representing relationships between a plurality of elements included in a system and location information that indicates, on the relationship graph, a plurality of locations where anomalies have been detected in the system, paths reached from a plurality of the locations on the relationship graph, the locations where the anomalies have been detected by backtracing, that is tracing directed edges of the relationship graph in backward direction and forwardtracing, that is tracing directed edges of the relationship graph in forward direction, the paths including a set of elements that are directly or indirectly related to each of the locations as a source; and extracting a shared extent that is an element, an edge, or a set of elements or edges, the element, the edge or the set of elements or edges being shared by at least a prescribed number of paths among the paths extracted, as an influence process of the anomalies.

* * * * *